United States Patent [19]

Cerio

[11] Patent Number: 4,562,629

[45] Date of Patent: Jan. 7, 1986

[54] VALVE SUPPORTING TOOL AND METHOD

[76] Inventor: Glenn R. Cerio, P.O. Box 9402, Renton, Wash. 98056

[21] Appl. No.: 650,859

[22] Filed: Sep. 17, 1984

[51] Int. Cl.[4] .......................... B21K 1/20; B23P 19/04

[52] U.S. Cl. ............................ 29/156.7 R; 29/213 R; 29/213 E; 29/402.03; 29/426.1; 29/559

[58] Field of Search ................. 29/213 R, 213 E, 214, 29/215, 156.7 R, 402.02, 402.03, 402.04, 402.08, 426.1, 559

[56] References Cited

U.S. PATENT DOCUMENTS

| | | | |
|---|---|---|---|
| 1,974,363 | 9/1934 | Miller | 29/215 |
| 2,240,897 | 5/1941 | Styles | 29/215 |
| 2,316,830 | 4/1943 | Zimmerman | 29/215 |
| 2,632,238 | 3/1953 | Dyck | 29/215 |
| 2,895,213 | 7/1959 | Killeen, Jr. | 29/213 |
| 3,038,247 | 6/1962 | Clark | 29/214 |
| 3,363,302 | 1/1968 | Haselmo | 29/215 |

*Primary Examiner*—Howard N. Goldberg
*Assistant Examiner*—Ronald S. Wallace
*Attorney, Agent, or Firm*—Delbert J. Barnard

[57] ABSTRACT

A valve member (18) can fall down into a cylinder chamber (14) in response to removal of a seating spring (30) from its outer end. This usually makes it necessary to detach the head (26) from the block (12) of an engine in order to perform work at the outer end of the valve member (18). The present invention provides a tool (T) in the form of a tubular body (60) having a nipple (66) at a first end to which a balloon (68) is attached. The balloon (68) and the nipple end (62, 66) of the tool (T) are inserted through a spark plug hole (56) to place the balloon (68) into the cylinder chamber (14). A pump (72) at the opposite end of the tool (T) is used to pump air into the balloon (68), inflating the balloon (68), so that the balloon will exert an outwardly directed force on the head (20) of the valve member (18), urging the valve member (18) towards its seated position. While the valve member (18) is so supported, the seating spring (30) is removed. Following the performance of work at the outer end of the valve member (18), a dump valve (76) is opened, allowing air to flow out from the balloon (68) and the tubular body (60). The tool (T) is then removed and a spark plug (54) is placed back in the spark plug hole (56).

15 Claims, 6 Drawing Figures

Fig. 4
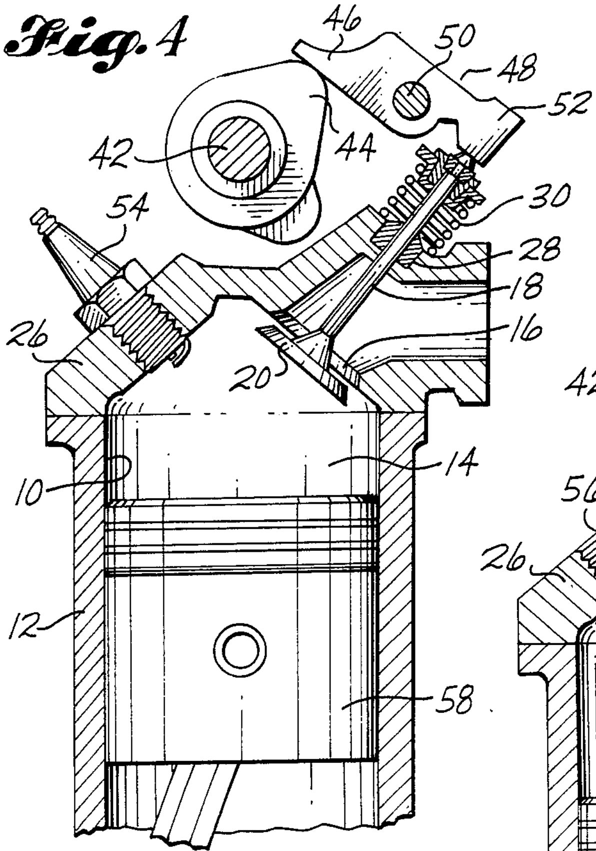
Fig. 5
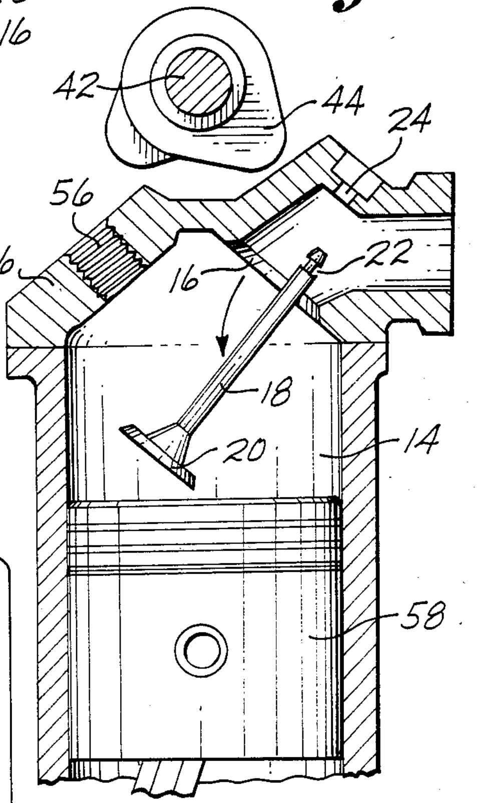
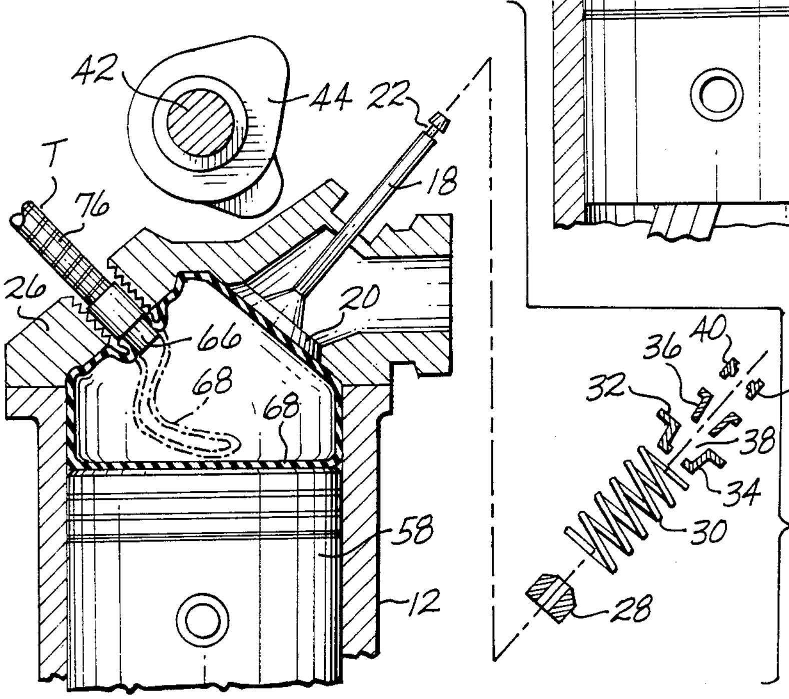
Fig. 6

VALVE SUPPORTING TOOL AND METHOD

TECHNICAL FIELD

This invention relates to a simple tool, and to a method of using such tool, for exerting an outwardly directed force on the cylinder end of a valve member for an internal combustion engine, for urging the valve member endwise outwardly towards its seated position, so that the seating spring can be removed from the outer end of the valve member without the valve member falling into the cylinder chamber, thus allowing work to be performed at the outer end of the valve member without it being necessary to disconnect the engine head from the engine block.

BACKGROUND ART

It is generally the practice to remove the head of an internal combustion engine from the block of the engine whenever it is desired to replace seals which exist at the outer ends of the valve members, for sealing against oil leakage around the valve members into the cylinder chambers. This is because that it is necessary to disconnect the seating spring from each valve member in order to do any work at the outer end of the valve member. Once the seating spring has been disconnected from the valve member, the valve member is free to drop into the cylinder chamber where it cannot be retrieved without taking the head off from the block.

Some mechanics have bent pieces of metal and have attempted to insert them through the spark plug hole up into a position against the inner end of the valve member, to in this manner prop the valve member into a substantially seated position. This procedure is very difficult to perform and it is most often not effective. Others have tried to do the same thing by use of screwdrivers or other elements.

A somewhat effective way of holding the valve members into a substantially seated position is to screw an inlet tube into the spark plug hole and then connect this tube to a high capacity compressor. A high capacity compressor has to be used because air is continuously leaking out through the cylinder. Thus, the air must be introduced into the cylinder at a fast enough rate so that there is a net outward force existing on the valve member, sufficient to hold it outwardly. Almost all individuals, and many garages, do not have high capacity compressors and so they cannot practice this technique.

DISCLOSURE OF THE INVENTION

According to the present invention, a tool is provided which is basically tubular in form. It includes first and second ends. A ballon is secured to the first end of the tube. A pump is located at the second end. The first end of the tube is sized so that it can be inserted into the cylinder of an engine, through the hole for the spark plug associated with the cylinder. Once the ballon is inside the cylinder chamber, the pump is operated for the purpose of blowing up the ballon. The inflating balloon exerts an endwise outwardly directed force on the cylinder end of the valve member, urging the cylinder member towards its seated position.

In accordance with a method aspect of the invention, the ballon is inserted into the cylinder chamber, the pump is used to blow up the balloon, and the balloon is used to urge the valve member endwise outwardly. The seating spring is then removed from the outer end of the valve member while the inflated balloon prevents the valve member from falling into the cylinder chamber. The mechanic then performs work at the outer end region of the valve member, such as replacing a seal which needs to be replaced, etc. and then reconnects the seating spring, or replaces it with a new seating spring. Then, the balloon is deflated, the tool is removed, and the spark plug or a replacement is inserted into the spark plug hole.

These and other objects, features, and advantages and characteristics of my invention will be apparent from the following detailed description of a typical embodiment of the invention in which reference is made to the accompanying drawing. The detailed description and the claims which follow are portions of the description of the invention.

BRIEF DESCRIPTION OF THE DRAWINGS

In the drawings, like reference characters refer to like parts throughout, and:

FIG. 4 is a vertical sectional view of one cylinder of an engine, showing a valve member with its seating spring attached, and an overhead cam system for depressing the valve member in opposition to the spring force, and showing a spark plug in a spark plug opening;

FIG. 5 is a view like FIG. 4, but with the seating spring removed, showing the valve member dropping down into the cylinder; and FIG. 6 is a view like FIGS. 4 and 5, but showing a tool of the present invention being used for providing a force against the inner end of the valve member, for urging it outwardly towards its seated position, such view also including an exploded view of a typical arrangement of elements at the outer end of the valve member.

BEST MODE FOR CARRYING OUT THE INVENTION

Figure 1:
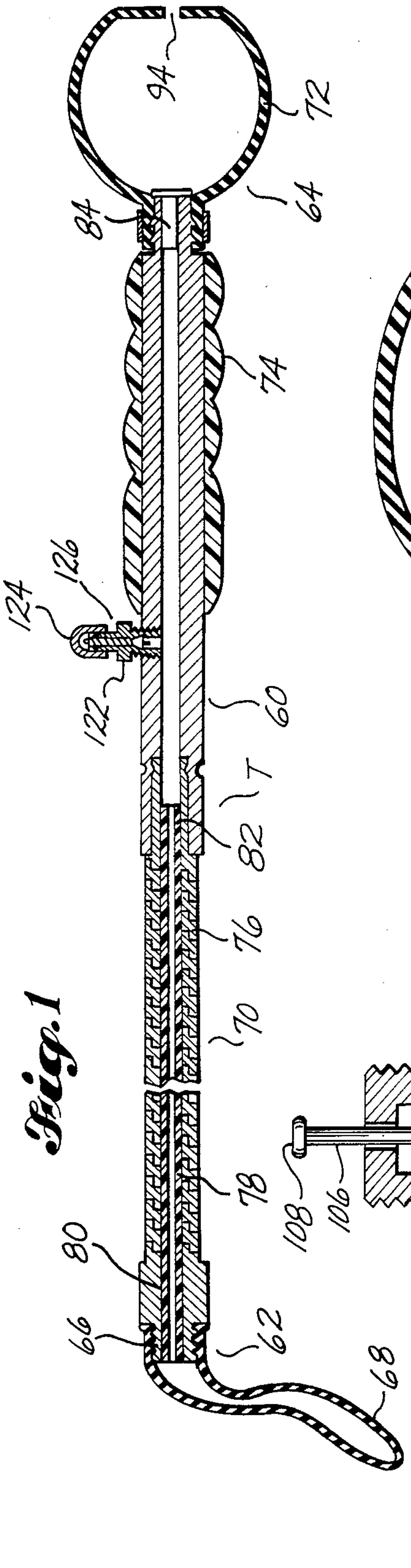
FIG. 1 is a longitudinal sectional view of a valve member supporting tool embodying the present invention.

Referring first to FIGS. 4 and 5, showing a typical cylinder construction for an overhead cam type engine, a cylinder bore 10 is formed in an engine block 12, together with a plurality of other cylinder bores (not shown).

The cylinder chamber 14 is provided with an inlet and an outlet each of which includes a reciprocating valve member. In FIGS. 4–6 only the outlet port 16 is shown. It is provided with a valve member 18 having a valve head 20 at its inner end and a keeper receiving groove 22 (FIGS. 5 and 6) at its outer end.

The valve stem extends through an opening 24 (FIG. 5) formed in the cylinder head 26. In the illustrated example, an annular seal member 28 is provided around the valve stem at the outer end of opening 24. A compression spring 30 surrounds the outer end portion of valve member 18 and at its inner end rests on a portion of the cylinder head 26 which surrounds the opening 24. The outer end of spring 30 contacts a flange 32 which is a part of a member 34. The valve stem extends through the opening in seal 28, through spring 30, and through an opening in member 34. A member 36 may be received in a socket 38 formed in member 34. The outer end of the valve stem also extends through member 36. A pair of keepers 40 are typically insertable into the annular groove 24, from opposite sides of the valve stem. As shown by FIG. 4, when all of these elements are in place, the flange including member 34 is effectively secured to the outer end of the valve stem, by use of the member 36 and the keepers 40, and the compression spring 30 is compressed to a degree and is positioned between the fixed head 26 and the flange 32 which is secured to and is movable with the valve member 18. The spring 30 biases the valve member 18 towards its seated position. Hence, spring 30 will hereinafter be referred to as the "seating" spring.

In operation of the engine, a cam shaft 42 is located above the head 26. A lobe 44 on cam shaft 42 associated with valve member 18 makes contact with one end 46 of a rocker arm 48. Rocker arm 48 is mounted for rotation about an axis 50. The opposite end 52 of rocker arm 48 makes contact with the outer end of valve member 18. As the cam shaft 42 rotates, the cam lobe 44 will rotate into contact with rocker arm portion 46, lifting it upwardly, and at the same time causing the opposite end 52 to rotate downwardly. As end 52 rotates downwardly it moves the valve member 18 endwise inwardly, in opposition to the spring force. The spring 30 is compressed. Lobe 44 then rotates out from contact with rocking arm portion 46. When this happens spring 30 functions to move the valve member 18 endwise outwardly, into its seated position.

Each cylinder also includes a spark plug 54 which is screwed into a spark plug hole 56. The cylinder also includes a reciprocating piston 58.

As earlier explained, it is desirable to sometimes work at the outer end of the valve member 18 without removing the head 26 from the block 12. As also earlier explained, one type of work at the outer end of the valve member is the replacement of the seal 28. It is generally accepted that an early cause of an engine burning oil is leakage around the valve member 18 due to a deterioration of the seal 28.

Mechanics normally advise customers that it is necessary to remove the head 26 from the block 12 whenever there is an oil burning problem. The customer is usually told that the cause of the oil burning could be either that the valves need to be ground or the piston 58 needs new rings. Quite probable, however, the oil burning is merely a cause of a bad seal 28.

FIG. 5 illustrates why it is generally considered necessary to separate the head 26 from the block 12, even to replace a seal 28. This is because it is necessary to remove the keepers 40 and disconnect the valve member 18 from the spring 30 in order to replace the seal 28. FIG. 5 very clearly shows what would happen if the spring 30 were merely to be removed, without the valve member 18 being in some way retained in place.

A device or tool of the present invention serves the purpose of providing an outwardly directed force on the inner end or head portion 20 of the valve member 18, for the purpose of urging the valve member 18 outwardly towards its seated position. The tool of the present invention makes this all possible without it being necessary to separate the head 26 from the block 12.

Figure 3:
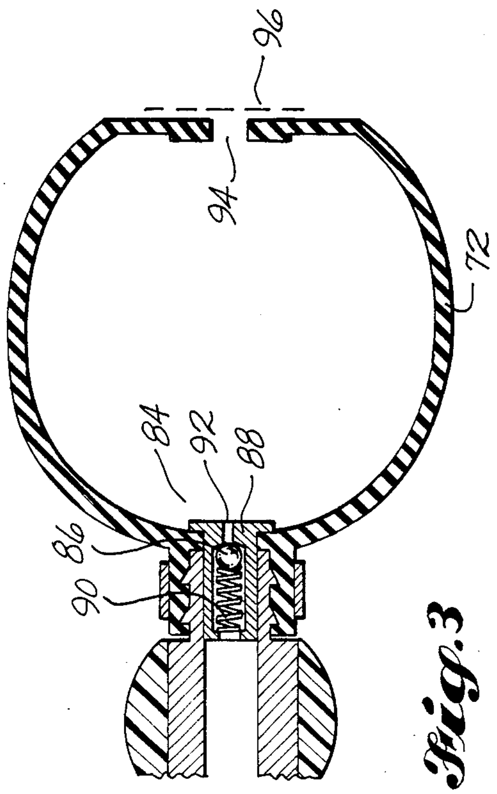
FIG. 3 is an enlarged scale fragmentary view of the pump end of the tool.
Figure 2:
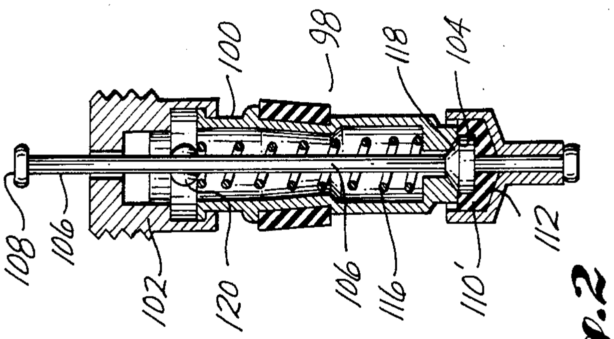
FIG. 2 is an enlarged scale longitudinal sectional view of a conventional valve assembly for an automobile tire.

Referring to FIGS. 1-3, FIG. 1 shows an embodiment of the tool T. It comprises an elongated tubular body or tube member 60. Member 60 includes a first end 62 and a second end 64. The first end 62 includes a nipple portion 66 on which the open end of a balloon 68 is attached. The end portion 70 of member 60 closest to the first end 62 is flexible so that it can be bent and turned relative to the opposite end 64. A hand pump 72 is provided at the second end of tubular body 60. A handle, which may include a hand grip 74, is located immediately inwardly of the pump 72. A dump valve 126 is located at the inner end of the handle 74, between handle 74 and the flexible section 70.

It is very important that the flexible section 70 not leak. One way of doing this is to provide a sectional metal jacket 76, constructed like or similar to the gooseneck portion of a gooseneck lamp. A continuous piece of plastic tubing 78 is located within the casing 76. Tubing 78 is glued or otherwise secured to the nipple end portion of member 76, such as at 80. Tube 78 extends from the nipple back through the casing 76, and terminates at 82.

By way of typical and therefore nonlimitative example, the hand pump 72 may be in the form of a squeeze ball, as shown. A check valve 84 is located at the pump end of tube 60. In FIG. 3 the check valve is shown in the form of a conventional check valve comprising a ball closure 86, a ball seat 88 and a spring 90. Spring 90 normally urges ball 86 into seating contact with the ball seat 88. When so seated, the ball 86 closes a port 92 in the valve seat. The pump bulb 72 includes an end opening 94 at its outer end. The user places the palm portion 96 of his hand against the back of the bulb 72 when he squeezes the bulb 72, so that the hole 94 will be closed. As a result, squeezing of the ball 72 will force the air in the ball through opening 92. The moving air will move the check valve ball 86, compressing spring 90, and allowing the air to flow through opening 92 into the interior of the tube 60.

Also by way of typical and therefore nonlimitative example, the dump valve 126 may comprise a standard tire valve assembly 98 (FIG. 2). This assembly is quite inexpensive and is very effective.

Referring to FIG. 2, the standard tire valve assembly 98 may comprise a tubular body 100 having an externally threaded end portion 102 and an end orifice 104 at its opposite end. The control member or stem 106 extends axially through the tubular body 100. It includes an upwardly directed end portion which normally extends outwardly beyond the threaded portion 102 and terminates in an enlarged head 108. The opposite end of control member 106 is connected to a valve plug 110 which may include a body of resilient material 112 arranged to seat against the end surface of tubular body 100, about the control orifice 104. A coil spring 116 is located within tubular body 100, in surrounding relationship to the control stem 106. The upper end of spring 116 abuts against an internal shoulder 118 formed within body 100. The upper end of spring 116 abuts against laterally projecting portions 120 of the control member 106. The spring 116 is always slightly compressed so that it normally biases the valve plug 110 into a seated position.

FIG. 1 shows this type of valve assembly 98 screwed into a stem-like housing 122 which is much like the valve stem portion of an automobile tire. A cap 124 may be provided, much in the same manner that the valve stem of a tire is provided with a cap.

Referring to FIG. 1, prior to use of the tool T, a balloon 68 is attached to the nipple 66. A balloon 68 is selected which has a smaller opening than the nipple 66 so that the balloon 68 has to be stretched to draw it over the nipple 66. The elastic nature of the balloon holds it in place. In another words, after the stretching pressure is removed, the balloon 68 will constrict itself about the nipple 66.

Next, the operator removes the spark plug 54 from the cylinder at which he will be performing some work. The balloon and the end portion of the tool T on which the balloon is secured are inserted through the spark plug opening 56, into a position much like what is shown by FIG. 6. Then, the operator places the palm portion 96 of his hand against the back of the pump bulb 72, and pushes on the bulb 72, to collapse bulb 72 and force from it a charge of air through the orifice 92 and into the tube 60, and from tube 60, into the balloon 68. After each collapse of the bulb 72, he removes his hand from the back of the bulb 74, so that a fresh charge of air can enter the opening 94. The check valve 86, 88 prevents air from flowing back out from the balloon 68 and the interior of the tube 66. The palm 96 is then again placed against the back of the pump bulb 72, and the bulb 72 is again depressed. This procedure is repeated until the balloon 68 has been inflated inside of the cylinder (FIG. 6). At this time the seating spring 30 can be removed. The balloon 68 will function to hold the valve member 18 endwise outwardly, into, or at least toward its seated position. It will be maintained in this position while the user replaces the seal 28, or performs whatever other task he wants to perform at the outer end portion of the valve member 18.

At the conclusion of the work, the spring 30 and the other parts 34, 36, 40 are reinstalled. In some cases, new elements may be used to replace old ones which need replacing.

After installation of the seating spring 30, the air can be let out of the balloon 68. This is simply done by depressing the operator 106 of the valve assembly 98. Next, the tool T is removed from the spark plug hole 56, and the same or a new spark plug 54 is installed into the hole 56.

As stated above, the illustrated example is just exactly that. It is an example. The details of construction of the tool T can vary in many ways. For example, the squeeze bulb type pump 72, although preferred, could be replaced by some other type of pump. The handle need not include a hand grip 74, or the handle could have an entirely different arrangement. A tire valve assembly like 98 could be substituted in place of the ball type check valve assembly 86, 88, etc. Also, the flexible portion 76 of tubular body 60 could be constructed differently. For example, a length of plastic or rubber tubing could be substituted for the metallic sheath 76 and the tube 78 inside of it. The important thing is that a simple tool be provided to which a balloon can be connected at one end, and such end and the balloon can be inserted into the spark plug hole, and compressed air can be introduced through the tube into the balloon, to inflate the balloon, to such an extent that the balloon imposes an outwardly directed force on the valve member, urging it towards its seated position, so that the valve member will not fall down into the cylinder chamber when the seating spring is removed from its outer end portion.

It is to be understood that the invention is not to be limited by the above discussed examples, but only by the terms of the appended claims.

What is claimed is:

1. A method of urging an engine valve member towards its seated position while the seating for such valve member spring is disconnected, comprising:

removing a spark plug from an engine cylinder to expose the spark plug hole for such cylinder;

placing a balloon on an end of a tube member;

inserting the balloon and the adjoining end portion of the tube member through the spark plug hole to in that manner place the balloon inside of the cylinder, in a space between the piston and the vavle member; and introducing compressed air through the tube member into the balloon, to inflate the balloon, to the extent necessary to cause the balloon to contact the valve member and force the valve member endwise outwardly toward its seated position; and maintaining the compressed air within said balloon to in that manner maintain a force on the valve member urging it endwise outwardly, while performing work at the outer end of the valve member.

2. A method according to claim 1, further comprising disconnecting a seating spring from the outer end of the valve member while the balloon is inflated and is urging the valve member endwise outwardly.

3. A method according to claim 1, comprising replacing a seal member at the outer portion of the valve member while the balloon is inflated and is urging the valve member endwise outwardly.

4. A method according to claim 2, comprising replacing a seal member at the outer portion of the valve member while the balloon is inflated and is urging the valve member endwise outwardly.

5. A method according to claim 4, comprising exhausting air out from said balloon through said tube member at the completion of the replacement of the seal member.

6. A method according to claim 4, comprising installing a seating spring and connecting it to the valve member following replacement of the seal member, and then removing air from the balloon through the tube member.

7. A method according to claim 2, comprising installation of a seating spring and connection of the seating spring to the valve member following completion of the work performed at the outer end of the valve member, followed by releasing air from the balloon through the tube member, followed by removing the tube member out from the spark plug hole and installing a spark plug in said spark plug hole.

8. A hand tool for use in supporting an engine valve member in a substantially seated position while a seating spring is disconnected from an outer end portion of the valve member, so that the valve member will not fall into its cylinder of the engine, comprising:

an elongated tube having first and second ends;

means at the first end for receiving a balloon;

pump means at the second end, operable for pumping air through the tube into the balloon; and said first end being sized so that it can be inserted into the cylinder of the engine, through a spark plug hole associated with such cylinder, with the balloon attached to it, for placing the balloon inside of the cylinder, whereby the pump means can be operated when the balloon is inside of the cylinder for inflating the balloon so that the balloon will contact the inner end of the valve member and urge the valve member endwise outwardly toward its seated position, and such balloon will maintain the valve member in a relatively outward position until the air is released from the balloon.

9. A hand tool according to claim 8, wherein the tube member includes a flexible body sealed against air leakage.

10. A hand tool according to claim 9, wherein the hand tool includes a check valve between the pump means and the second end of the tube, functioning to prevent the flow of air back from the tube into the pump means.

11. A hand tool according to claim 10, wherein the hand tool includes an outlet port connected to the elongated tube at a location placing such outlet port outside of the cylinder when the first end of the tool is located in the spark plug hole, and an operator controlled dump valve normally closing the outlet port.

12. A hand tool according to claim 11, wherein the pump means is a hand squeezable element for forcing air through the elongated tube when squeezed by the hand of the operator.

13. A hand tool according to claim 12, wherein the normally closed dump valve comprises a valve of the type used in a valve stem of a tire and includes a valve plug member and a member for depressing the valve plug member.

14. A hand tool according to claim 8, wherein the elongated tube has a flexible end portion at the first end of the elongated tube, a hand operated pump at the second end of the elongated tube, and a handle between the pump and the flexible portion of the elongated tube.

15. A hand tool according to claim 14, comprising a dump valve located between the handle and the flexible portion of the elongated tube, operable for dumping air out from the elongated tube and any balloon attached to the first end of the hand tool.

* * * * *